United States Patent
Swope et al.

(10) Patent No.: US 11,459,744 B2
(45) Date of Patent: Oct. 4, 2022

(54) IN-PIPE STORM WATER FILTER

(71) Applicant: United States Government as represented by the Secretary of the Navy, San Diego, CA (US)

(72) Inventors: Brandon Lawson Swope, San Diego, CA (US); Leonard David Sinfield, Rail Road Flat, CA (US); Patrick John Earley, San Diego, CA (US); Alexander Gregory Stevens-Bracy, Chula Vista, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 97 days.

(21) Appl. No.: 17/140,982

(22) Filed: Jan. 4, 2021

(65) Prior Publication Data
US 2022/0213677 A1    Jul. 7, 2022

(51) Int. Cl.
| | | |
|---|---|---|
| *E03F 5/04* | (2006.01) | |
| *C02F 1/00* | (2006.01) | |
| *B01D 29/25* | (2006.01) | |
| *C02F 103/00* | (2006.01) | |

(52) U.S. Cl.
CPC .......... *E03F 5/0404* (2013.01); *B01D 29/25* (2013.01); *C02F 1/001* (2013.01); *B01D 2201/0415* (2013.01); *B01D 2201/325* (2013.01); *C02F 2103/001* (2013.01)

(58) Field of Classification Search
None
See application file for complete search history.

(56) References Cited

U.S. PATENT DOCUMENTS

| | | | | |
|---|---|---|---|---|
| 122,209 | A * | 12/1871 | Ashman et al. | E03F 5/0404 |
| | | | | 210/163 |
| 142,238 | A * | 8/1873 | Jenings | E03F 9/002 |
| | | | | 210/170.03 |
| 150,164 | A * | 4/1874 | Kacserowsky | F23J 3/026 |
| | | | | 15/171 |
| 232,948 | A * | 10/1880 | Dernham | E03F 1/00 |
| | | | | 210/163 |
| 248,559 | A * | 10/1881 | Jackson | A61B 10/007 |
| | | | | 4/220 |
| 530,816 | A * | 12/1894 | Wright | E02D 29/12 |
| | | | | 210/247 |

(Continued)

OTHER PUBLICATIONS

REM Filters; Triton TT2 Filter; Revel Environmental Manufacturing; Available at https://remfilters.com/tdam-tt2-filter-2/; 2017.

(Continued)

*Primary Examiner* — Robert J Popovics
(74) *Attorney, Agent, or Firm* — Naval Information Warfare Center Pacific; Kyle Eppele; J. Eric Anderson (57) ABSTRACT

A filter for filtering storm water in an outfall pipe comprising: a line comprising an anchor attachment point at a proximal end of the line; and a plurality of individual treatment units (ITUs) securely connected in series to the line with a gap between adjacent ITUs, wherein each ITU has a size and shape capable of fitting inside the outfall pipe, and wherein each ITU comprises a mesh cage configured to filter contaminants out of the storm water.

14 Claims, 6 Drawing Sheets

(56) References Cited

U.S. PATENT DOCUMENTS

| | | | | |
|---|---|---|---|---|
| 1,033,587 A * | 7/1912 | Hodgman | G02B 6/4464 | 254/134.4 |
| 1,115,016 A * | 10/1914 | Pheils | B65F 1/1447 | 193/11 |
| 1,178,355 A * | 4/1916 | Stein | B01D 29/15 | 294/68.21 |
| 1,207,776 A * | 12/1916 | McDonald | B04B 11/04 | 210/324 |
| 1,728,381 A * | 9/1929 | Waters | A47J 31/446 | 210/474 |
| 1,746,121 A * | 2/1930 | Levy | E03F 5/14 | 210/237 |
| 2,102,310 A * | 12/1937 | Egan | E03F 5/0404 | 210/247 |
| 2,263,259 A * | 11/1941 | Boosey | E03C 1/282 | 137/247.35 |
| 2,414,487 A * | 1/1947 | Schuttler | B07B 1/50 | 210/474 |
| 2,481,152 A * | 9/1949 | Redmond, Sr. | B08B 9/0436 | 15/104.31 |
| 2,508,659 A * | 5/1950 | Brown | B08B 9/055 | 15/104.31 |
| 2,735,122 A * | 2/1956 | Pletcher | E03F 9/002 | 134/8 |
| 2,781,663 A * | 2/1957 | Maly | E21B 33/124 | 166/264 |
| 2,796,988 A * | 6/1957 | Loffler | E03F 5/042 | 210/135 |
| 2,942,668 A * | 6/1960 | Maly | E21B 33/1208 | 166/227 |
| 3,282,430 A * | 11/1966 | Kinne | A01G 25/00 | 210/162 |
| 3,745,659 A * | 7/1973 | Hsu | G01F 23/04 | 33/720 |
| 3,951,812 A * | 4/1976 | Hsu | B01D 17/0202 | 73/61.61 |
| 4,061,807 A * | 12/1977 | Shaler | B01J 20/28004 | 428/36.5 |
| 4,078,433 A * | 3/1978 | McCabe, Jr. | G01N 1/12 | 73/864.61 |
| 4,189,386 A * | 2/1980 | Aman | B01D 29/117 | 210/264 |
| 4,246,998 A * | 1/1981 | O'Ffill | B01J 19/0053 | 209/281 |
| 4,337,096 A * | 6/1982 | Clifford | E03F 9/002 | 134/8 |
| 4,419,232 A * | 12/1983 | Arntyr | E03F 5/0404 | 210/170.03 |
| 4,419,236 A * | 12/1983 | Hsu | B01D 17/0202 | 33/721 |
| 4,438,654 A * | 3/1984 | Torstensson | E21B 49/083 | 166/264 |
| 4,538,683 A * | 9/1985 | Chulick | E21B 33/124 | 166/264 |
| 4,608,166 A * | 8/1986 | Cain | B01D 29/23 | D23/209 |
| 4,689,145 A * | 8/1987 | Mathews | B01D 29/56 | 210/260 |
| 4,699,163 A * | 10/1987 | Baziuk | B08B 9/0495 | 239/560 |
| 4,715,747 A * | 12/1987 | Behrens | F16L 55/48 | 405/303 |
| 4,758,350 A * | 7/1988 | Pitts | B01D 17/0202 | 210/243 |
| 4,775,473 A * | 10/1988 | Johnson | C09K 3/32 | 210/502.1 |
| 4,838,079 A * | 6/1989 | Harris | F16L 39/00 | 73/863.33 |
| 4,860,805 A * | 8/1989 | Townsend | A47C 27/085 | 210/485 |
| 4,861,469 A * | 8/1989 | Rossi | F02M 37/50 | 210/DIG. 6 |
| 4,861,470 A * | 8/1989 | Casey | F02M 37/0082 | 210/DIG. 6 |
| 4,882,055 A * | 11/1989 | Stamstad | B01D 29/13 | 264/328.14 |
| 5,037,541 A * | 8/1991 | Ruey-Jang | E03F 5/06 | 210/155 |
| 5,069,722 A * | 12/1991 | Murphy | B08B 9/0436 | 134/22.12 |
| 5,072,538 A * | 12/1991 | Hendricks | A01K 97/01 | 210/470 |
| 5,117,685 A * | 6/1992 | Goldschild | E21B 47/00 | 73/152.55 |
| 5,122,193 A * | 6/1992 | Derlein | B08B 9/0436 | 134/22.12 |
| 5,130,018 A * | 7/1992 | Tolman | B01D 17/0202 | 210/DIG. 6 |
| 5,232,587 A * | 8/1993 | Hegemier | E03F 5/0404 | 210/170.03 |
| 5,252,203 A * | 10/1993 | Lyda | B01D 17/0214 | 210/DIG. 6 |
| 5,252,204 A * | 10/1993 | Chiodo | B01D 29/111 | 210/232 |
| 5,264,134 A * | 11/1993 | McCamy | B01D 17/0214 | 210/747.2 |
| 5,266,194 A * | 11/1993 | Chiodo | B01D 39/12 | 210/232 |
| 5,364,473 A * | 11/1994 | Van Der Does | B08B 9/055 | 134/22.12 |
| 5,372,714 A * | 12/1994 | Logue, Jr. | E03F 5/0404 | 404/5 |
| 5,397,464 A * | 3/1995 | Hannon | E03F 5/0404 | 210/473 |
| 5,403,474 A * | 4/1995 | Emery | E03F 5/046 | 210/474 |
| 5,405,539 A * | 4/1995 | Schneider | E03F 5/0404 | 210/170.03 |
| 5,417,906 A * | 5/1995 | Chiodo | B01D 39/12 | 264/156 |
| 5,441,637 A * | 8/1995 | Gutjahr | B01D 35/0273 | 210/485 |
| 5,454,275 A * | 10/1995 | Kabis | G01N 1/12 | 166/162 |
| 5,480,254 A * | 1/1996 | Autry | E03F 5/0404 | 210/791 |
| 5,511,904 A * | 4/1996 | Van Egmond | E03F 1/002 | 405/36 |
| 5,562,819 A * | 10/1996 | Turner, Jr. | B01D 29/96 | 210/170.03 |
| 5,575,925 A * | 11/1996 | Logue, Jr. | E03F 5/0404 | 404/5 |
| 5,580,393 A * | 12/1996 | Lawther | B08B 9/0436 | 134/8 |
| 5,686,673 A * | 11/1997 | Kabis | G01N 1/12 | 73/863.31 |
| 5,695,651 A * | 12/1997 | Fraud | B01D 29/605 | 261/6 |
| 5,779,888 A * | 7/1998 | Bennett | B01D 29/945 | 210/170.03 |
| 5,820,762 A * | 10/1998 | Barner | E03F 5/0404 | 210/255 |
| 5,849,198 A * | 12/1998 | Sharpless | C02F 1/285 | 210/247 |
| 5,868,858 A * | 2/1999 | Creed | B08B 9/0436 | 15/345 |
| 5,980,740 A * | 11/1999 | Harms | E03F 5/14 | 210/170.03 |
| 5,993,656 A * | 11/1999 | Cordani | B01D 17/0202 | 210/502.1 |
| 5,996,423 A * | 12/1999 | Baghel | G01N 1/34 | 73/863.23 |
| 6,065,355 A * | 5/2000 | Schultz | E21B 49/081 | 166/264 |
| 6,084,052 A * | 7/2000 | Aufdermarsh | E21B 47/017 | 250/580 |
| 6,086,756 A * | 7/2000 | Roy | B01D 21/0012 | 210/170.03 |

(56) References Cited

U.S. PATENT DOCUMENTS

| | | | | |
|---|---|---|---|---|
| 6,099,723 A * | 8/2000 | Morris | E03F 1/00 | 210/170.03 |
| 6,105,305 A * | 8/2000 | Edens | A01K 97/20 | 224/406 |
| 6,106,706 A * | 8/2000 | Roy | E03F 1/00 | 210/136 |
| 6,106,707 A * | 8/2000 | Morris | E03F 1/00 | 210/337 |
| 6,149,803 A * | 11/2000 | DiLoreto, Jr. | B01D 29/96 | 210/170.03 |
| 6,178,565 B1 * | 1/2001 | Franco | E03F 1/00 | 4/291 |
| 6,196,074 B1 * | 3/2001 | Varhol | E21B 49/082 | 73/863.23 |
| 6,200,484 B1 * | 3/2001 | McInnis | E03F 5/0404 | 210/170.03 |
| 6,254,770 B1 * | 7/2001 | Remon | E03F 5/0404 | 210/163 |
| 6,270,663 B1 * | 8/2001 | Happel | B01D 35/22 | 210/170.03 |
| 6,272,938 B1 * | 8/2001 | Baghel | G01N 33/1826 | 73/863.56 |
| 6,294,095 B1 * | 9/2001 | Lewis | E03F 1/00 | 210/477 |
| 6,334,953 B1 * | 1/2002 | Singleton | E03F 5/14 | 405/36 |
| 6,358,405 B1 * | 3/2002 | Leahy | E03F 5/14 | 210/170.03 |
| 6,368,499 B1 * | 4/2002 | Sharpless | E03F 5/0404 | 210/164 |
| 6,428,692 B2 | 8/2002 | Happel | | |
| 6,478,954 B1 * | 11/2002 | Turner, Jr. | E03F 5/12 | 210/170.03 |
| 6,485,639 B1 * | 11/2002 | Gannon | B01J 20/261 | 210/170.03 |
| 6,503,390 B1 * | 1/2003 | Gannon | B01D 17/0202 | 210/170.03 |
| 6,508,261 B1 * | 1/2003 | Nezat, II | E03F 9/002 | 134/167 C |
| 6,511,595 B2 * | 1/2003 | Crompton | B01D 21/26 | 210/309 |
| 6,521,122 B1 * | 2/2003 | Elliot | E03F 5/0404 | 210/170.03 |
| 6,523,554 B1 * | 2/2003 | Bryant, Sr. | B08B 9/0495 | 210/162 |
| 6,531,059 B1 * | 3/2003 | Morris | B01D 29/58 | 210/170.03 |
| 6,533,941 B2 * | 3/2003 | Butler | E03F 5/0404 | 210/170.03 |
| 6,537,446 B1 * | 3/2003 | Sanguinetti | E03F 5/0404 | 210/474 |
| 6,537,447 B2 * | 3/2003 | Remon | E02D 29/12 | 210/163 |
| 6,602,408 B1 * | 8/2003 | Berkey | B01D 35/027 | 210/477 |
| 6,679,994 B1 * | 1/2004 | Turco | E03F 5/12 | 210/791 |
| 6,712,976 B2 * | 3/2004 | Manzone | B01J 20/3042 | 210/764 |
| 6,722,508 B2 * | 4/2004 | Parker | B01D 35/15 | 210/485 |
| 6,767,456 B2 * | 7/2004 | Middleton | B01J 20/28023 | 210/170.03 |
| 6,793,811 B1 * | 9/2004 | Fleischmann | E03F 1/00 | 210/170.03 |
| 6,805,804 B2 * | 10/2004 | Page | B01D 17/0202 | 210/170.03 |
| 6,824,677 B2 * | 11/2004 | Martinez | E03F 1/00 | 210/170.03 |
| 6,841,077 B2 * | 1/2005 | Gannon | B01D 15/00 | 210/170.03 |
| 6,865,933 B1 * | 3/2005 | Einarson | E21B 49/081 | 73/864.33 |
| 6,866,153 B2 * | 3/2005 | Turner, Jr. | B01D 29/27 | 210/162 |
| 6,869,525 B1 * | 3/2005 | Happel | B01D 21/02 | 210/163 |
| 6,869,526 B2 * | 3/2005 | Sharpless | C02F 1/285 | 210/170.03 |
| 6,884,343 B2 * | 4/2005 | Harris | B01D 29/014 | 210/163 |
| 6,974,540 B1 * | 12/2005 | Fleischmann | E03F 1/00 | 210/163 |
| 6,994,738 B2 * | 2/2006 | Taddey | B64D 13/00 | 55/306 |
| 7,014,755 B2 * | 3/2006 | Muir | C02F 1/285 | 210/283 |
| 7,033,108 B1 * | 4/2006 | Hummert | F16K 21/20 | 405/36 |
| 7,084,521 B1 * | 8/2006 | Martin | F03B 13/086 | 290/53 |
| 7,094,338 B2 * | 8/2006 | Morris | B01D 29/58 | 264/DIG. 48 |
| 7,112,274 B1 * | 9/2006 | Sanguinetti | B01D 29/01 | 210/474 |
| 7,114,877 B2 * | 10/2006 | Wilkerson | E02B 11/00 | 47/65.5 |
| 7,128,832 B2 * | 10/2006 | Wade | E03B 3/02 | 210/162 |
| 7,186,333 B2 * | 3/2007 | Kluge | E03F 1/00 | 210/691 |
| 7,208,082 B2 * | 4/2007 | Hurst | E03F 5/0404 | 210/691 |
| 7,270,747 B2 * | 9/2007 | Happel | E03F 5/12 | 210/162 |
| 7,306,000 B1 * | 12/2007 | Nezat, II | B08B 9/053 | 134/166 C |
| 7,309,420 B1 * | 12/2007 | Trangsrud | E03F 1/00 | 210/170.03 |
| 7,325,443 B2 * | 2/2008 | De Jonge | G01N 13/00 | 73/64.56 |
| 7,407,574 B2 * | 8/2008 | Robinson | E04D 13/0767 | 52/12 |
| 7,428,849 B2 * | 9/2008 | Musa | G01N 1/12 | 73/864.51 |
| 7,430,929 B1 * | 10/2008 | Vroblesky | E02D 1/06 | 73/864.74 |
| 7,465,391 B2 * | 12/2008 | Heist | B01D 29/03 | 210/791 |
| 7,479,221 B2 * | 1/2009 | Paoluccio | E03F 1/00 | 210/163 |
| 7,485,218 B2 * | 2/2009 | Dussich, I | E03F 1/00 | 210/255 |
| 7,658,804 B1 * | 2/2010 | Cano | B08B 9/0553 | 15/387 |
| 7,658,857 B2 * | 2/2010 | Wacome | E03F 5/0404 | 210/170.03 |
| 7,771,591 B2 * | 8/2010 | Lucas | E03F 5/0404 | 210/489 |
| 7,785,516 B2 * | 8/2010 | Malkin | B01D 29/15 | 264/DIG. 48 |
| 7,799,235 B2 * | 9/2010 | Olson | B01D 29/96 | 210/232 |
| 7,802,486 B2 * | 9/2010 | Herzog | B09C 1/002 | 73/864.34 |
| 7,879,233 B2 * | 2/2011 | Shaw | E03F 5/0404 | 210/164 |
| 7,959,799 B2 * | 6/2011 | Happel | B01D 21/0012 | 210/166 |
| 7,981,283 B2 * | 7/2011 | Happel | E03F 5/14 | 210/162 |
| 8,002,977 B2 * | 8/2011 | Shaw | E03F 5/0404 | 210/232 |
| 8,012,346 B2 * | 9/2011 | Peters, Jr. | E03F 5/0404 | 210/170.03 |
| 8,017,006 B2 * | 9/2011 | Lopez | E03F 1/00 | 210/170.03 |

(56) References Cited

U.S. PATENT DOCUMENTS

| | | | | |
|---|---|---|---|---|
| 8,029,667 B2* | 10/2011 | Santinon | B60K 15/04 210/172.6 |
| 8,034,237 B2* | 10/2011 | Happel | E03F 5/12 210/170.03 |
| 8,038,889 B2* | 10/2011 | Munn | B01D 29/6484 210/170.03 |
| 8,043,498 B2* | 10/2011 | Rueda | E03F 5/0404 210/348 |
| 8,051,568 B2* | 11/2011 | Moody | E03F 5/0404 210/691 |
| 8,137,564 B2* | 3/2012 | Gannon | B01J 20/26 210/259 |
| 8,158,010 B2* | 4/2012 | Pearse | E03F 5/125 210/799 |
| 8,168,064 B2* | 5/2012 | Peters, Jr. | E03F 5/06 210/170.03 |
| 8,216,453 B2* | 7/2012 | Moody | E03F 5/0404 210/232 |
| 8,216,479 B2* | 7/2012 | Lambert, V | E03F 1/002 210/170.03 |
| 8,221,632 B2* | 7/2012 | McInnis | E03F 5/0404 210/170.03 |
| 8,287,728 B2* | 10/2012 | Kania | C02F 3/101 210/170.03 |
| 8,366,923 B1* | 2/2013 | Happel | E03F 5/14 210/170.03 |
| 8,429,986 B2* | 4/2013 | Lee | G01N 1/12 73/864.66 |
| 8,491,797 B1* | 7/2013 | Happel | E03F 5/14 210/170.03 |
| 8,522,629 B2* | 9/2013 | Lee | G01N 1/14 73/864.35 |
| 8,557,109 B1* | 10/2013 | Sutherland | E03F 5/0404 210/163 |
| 8,608,956 B2* | 12/2013 | Moulton | E03F 5/0404 210/473 |
| 8,623,203 B2* | 1/2014 | Peters, Jr. | E03F 5/14 210/170.03 |
| 8,652,323 B2* | 2/2014 | Dorsey | E03F 5/046 210/164 |
| 8,679,328 B2* | 3/2014 | Hebert | E03F 5/0404 210/163 |
| 8,763,478 B2* | 7/2014 | Riess | G01N 1/02 73/863.21 |
| 8,828,104 B2* | 9/2014 | Boezi | C10L 1/02 210/490 |
| 8,834,714 B2* | 9/2014 | Chien | E03F 5/0404 210/166 |
| 8,906,232 B2* | 12/2014 | McInnis | E03F 5/14 210/170.03 |
| 8,974,604 B2* | 3/2015 | Baziuk | B08B 9/0433 134/22.12 |
| 8,980,084 B2* | 3/2015 | Dorsey | E03F 5/14 210/163 |
| 9,045,891 B2* | 6/2015 | Peters, Jr. | E03F 5/105 |
| 9,051,192 B2* | 6/2015 | Kent | E03F 5/041 |
| 9,057,189 B2* | 6/2015 | Flury | E03F 5/046 |
| 9,194,116 B2* | 11/2015 | Bailey | E03F 5/0404 |
| 9,194,771 B2* | 11/2015 | Intelisano | G01N 1/10 |
| 9,322,156 B2* | 4/2016 | McInnis | E03F 5/0403 |
| 9,340,965 B2* | 5/2016 | Happel | E03F 5/125 |
| 9,388,560 B2* | 7/2016 | Raynor | B01D 29/96 |
| 9,683,921 B2* | 6/2017 | Halden | B01D 53/025 |
| 9,709,471 B2* | 7/2017 | Riess | G01N 1/02 |
| 9,726,013 B2* | 8/2017 | Cordry | E21B 49/082 |
| 9,752,315 B1* | 9/2017 | Phillips | E03F 5/0411 |
| 9,937,537 B2* | 4/2018 | Alexander | E03B 3/18 |
| 9,962,638 B1* | 5/2018 | Tucker | B01D 35/1573 |
| 9,982,418 B2* | 5/2018 | Bennett | E03B 7/095 |
| 10,094,747 B2* | 10/2018 | Intelisano | G01N 1/10 |
| 10,145,341 B2* | 12/2018 | Kim | F02M 37/14 |
| 10,154,751 B2* | 12/2018 | DeMiglio | A47J 31/0689 |
| 10,287,769 B2* | 5/2019 | Fink | B01D 21/02 |
| 10,334,839 B2* | 7/2019 | Deurloo | E03F 5/042 |
| 10,384,155 B1* | 8/2019 | DiLalla | E03F 5/0404 |
| 10,422,119 B2* | 9/2019 | Coppola | E03F 5/0404 |
| 10,436,161 B2* | 10/2019 | Kim | F02M 37/50 |
| 10,465,371 B2* | 11/2019 | Wacome | E03F 5/106 |
| 10,495,503 B2* | 12/2019 | Verreydt | G01N 33/1886 |
| 10,662,637 B2* | 5/2020 | Moran | B01D 21/0039 |
| 10,704,993 B2* | 7/2020 | Barnhart | C12Q 1/64 |
| 10,724,224 B2* | 7/2020 | Deurloo | E03F 5/046 |
| 10,753,077 B2* | 8/2020 | Coppola | E03F 5/16 |
| 10,786,765 B2* | 9/2020 | DiLalla | B01D 29/27 |
| 10,844,588 B1* | 11/2020 | Riley | B01D 29/23 |
| 10,928,525 B2* | 2/2021 | Kwon | G01T 1/169 |
| 11,096,386 B2* | 8/2021 | Deurloo | E03F 5/042 |
| 11,098,555 B2* | 8/2021 | Robinson | E21B 33/138 |
| 11,198,998 B1* | 12/2021 | Zung | E03F 1/001 |
| 11,224,830 B2* | 1/2022 | Wildermuth | B01D 29/96 |
| 11,332,918 B2* | 5/2022 | Deurloo | E03F 5/0404 |
| 11,346,094 B2* | 5/2022 | Lee | B01D 35/02 |
| 2001/0030150 A1* | 10/2001 | Remon | E03F 1/00 210/163 |
| 2002/0104789 A1* | 8/2002 | Harris | E03F 1/00 210/162 |
| 2002/0113025 A1* | 8/2002 | Gauldin | E03F 5/0401 210/767 |
| 2003/0047497 A1* | 3/2003 | Harris | E03F 1/00 210/170.03 |
| 2003/0127380 A1* | 7/2003 | Morris | B01D 29/05 210/164 |
| 2003/0201222 A1* | 10/2003 | Malkin | B01D 29/15 210/485 |
| 2004/0016692 A1* | 1/2004 | Sasaki | B01D 29/27 210/473 |
| 2004/0065601 A1* | 4/2004 | Martinez | E03F 1/00 210/162 |
| 2005/0183997 A1* | 8/2005 | Happel | E03F 5/0404 210/163 |
| 2005/0199537 A1* | 9/2005 | Kluge | E03F 5/0404 210/164 |
| 2006/0163130 A1* | 7/2006 | Happel | E03F 5/14 210/163 |
| 2006/0207922 A1* | 9/2006 | Dussich | E03F 5/0404 210/164 |
| 2007/0221554 A1* | 9/2007 | Wright | B01D 46/0087 210/120 |
| 2008/0093280 A1* | 4/2008 | Kang | E03F 5/0404 210/163 |
| 2009/0101553 A1* | 4/2009 | Lucas | E03F 5/0404 210/164 |
| 2009/0297271 A1* | 12/2009 | Hummert | F16K 21/20 405/51 |
| 2010/0084348 A1* | 4/2010 | Munn | B01D 29/6484 210/106 |
| 2010/0133201 A1* | 6/2010 | Wacome | E03F 5/0404 210/170.03 |
| 2010/0269929 A1* | 10/2010 | Dodds | E02B 9/06 137/544 |
| 2011/0000862 A1* | 1/2011 | Semba | E03F 5/14 210/304 |
| 2011/0003400 A1* | 1/2011 | Halden | G01N 1/405 422/430 |
| 2011/0155672 A1* | 6/2011 | McInnis | E03F 5/04 210/166 |
| 2011/0168612 A1* | 7/2011 | Happel | E03F 5/12 210/122 |
| 2011/0278237 A1* | 11/2011 | McInnis | E03F 5/14 210/163 |
| 2012/0145612 A1* | 6/2012 | McInnis | E03F 5/0404 210/163 |
| 2012/0222500 A1* | 9/2012 | Riess | G01N 1/405 73/863.23 |
| 2013/0118963 A1* | 5/2013 | Bailey | E03F 5/0404 137/15.01 |
| 2013/0186811 A1* | 7/2013 | Kaiser | E03F 5/0404 210/163 |

(56) References Cited

U.S. PATENT DOCUMENTS

| | | | | |
|---|---|---|---|---|
| 2013/0228527 A1* | 9/2013 | Crasti | C02F 1/004 | 210/170.03 |
| 2013/0264255 A1* | 10/2013 | Raynor | B01D 35/02 | 210/154 |
| 2013/0292317 A1* | 11/2013 | Shaw | E03F 5/0404 | 210/283 |
| 2013/0299402 A1* | 11/2013 | Rogahn | E03F 5/0404 | 210/163 |
| 2013/0299435 A1* | 11/2013 | Coffman | E02B 5/085 | 210/170.03 |
| 2013/0341287 A1* | 12/2013 | Panousis | E02B 5/085 | 210/747.6 |
| 2014/0027362 A1* | 1/2014 | Kent | E03F 5/0404 | 210/170.03 |
| 2014/0238915 A1* | 8/2014 | McInnis | E03F 5/0404 | 210/170.03 |
| 2014/0290391 A1* | 10/2014 | Varhol | E21B 49/08 | 73/863.23 |
| 2014/0374332 A1* | 12/2014 | Hannah | A01G 9/026 | 210/170.03 |
| 2015/0071716 A1* | 3/2015 | Regenauer | E02B 3/02 | 405/302.6 |
| 2015/0354242 A1* | 12/2015 | Saccoccio | B01D 29/50 | 210/806 |
| 2018/0023280 A1* | 1/2018 | Hannah | E03F 5/0404 | 210/170.03 |
| 2018/0180457 A1* | 6/2018 | Verreydt | G01N 1/10 | |
| 2019/0063383 A1* | 2/2019 | Kim | F02M 37/50 | |
| 2019/0292766 A1* | 9/2019 | Riley | C02F 1/285 | |
| 2019/0358564 A1* | 11/2019 | DiLalla | E03F 5/0404 | |
| 2020/0054973 A1* | 2/2020 | Wildermuth | B01D 35/02 | |
| 2022/0023778 A1* | 1/2022 | Zarraonandia | B01D 29/96 | |

OTHER PUBLICATIONS

Storm Water Systems Inc.; StormX Netting Trash Trap; Available at https://stormwatersystems.com/stormx-netting-trash-trap/; 2020.

ACF Environmental; StormSack; Available at https://acfenironmental.com/products/inlet-protection/drop-inlet-post-construction/stormsack-2/; 2020.

\* cited by examiner

# IN-PIPE STORM WATER FILTER

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, Calif., 92152; voice (619) 553-5118; ssc_pac_t2@navy.mil. Reference Navy Case Number 112209.

BACKGROUND OF THE INVENTION

Most best management practices for handling storm water focus on removing particles or contaminants from surface areas prior to a storm when they can be picked up by the storm water and be washed into a drain or outfall pipe. There also are filter inserts that may be used at the inlet (i.e., the point of draining from the street or other surface) and/or the outlet of an outfall pipe or storm drain system. There is a need for an improved device for filtering contaminants out of storm water.

SUMMARY

Described herein is a filter for filtering storm water in an outfall pipe comprising: a line and a plurality of individual treatment units (ITUs). The line comprises an anchor attachment point at a proximal end of the line. The plurality of ITUs are securely connected in series to the line with a gap between adjacent ITUs. Each ITU has a size and shape capable of fitting inside the outfall pipe. Each ITU comprises a mesh cage configured to filter contaminants out of the storm water.

One embodiment of the storm water filter disclosed herein comprises ITUs that are substantially cylindrical in shape and securely and serially connected to the line with a gap between adjacent ITUs such that axes of the ITUs are parallel with an axis of the outfall pipe. In this embodiment, each ITU has an axis-orthogonal cross-section that is less than half of an axis-orthogonal cross-section of the outfall pipe and each ITU has a mesh cage configured to filter contaminants out of the storm water. Also in this embodiment, the line with ITUs attached is configured to be placed within the outfall pipe between the inlet and the outlet.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed filter below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise.

Figure 1:
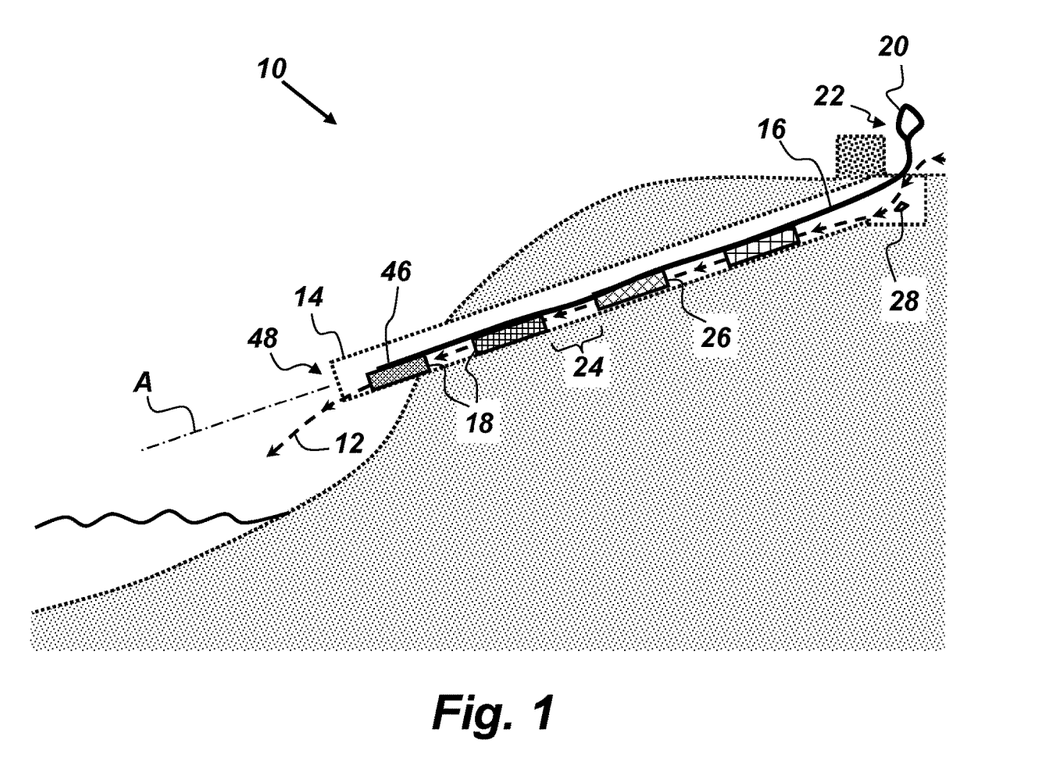
FIG. 1 is a side-view illustration of an embodiment of a storm water filter.

FIG. 1 is a side view of a filter 10 for filtering storm water 12 in an outfall pipe 14 or storm drain. The filter 10 comprises, consists of, or consists essentially of a line 16 and a plurality of individual treatment units (ITUs) 18. The line 16 comprises an anchor attachment point 20 at a proximal end 22 of the line 16. The plurality of ITUs 18 are securely connected in series to the line 16 with a gap 24 between adjacent ITUs 18. Each ITU 18 has a size and shape such that it can fit inside the outfall pipe 14. Each ITU 18 comprises a mesh cage 26 configured to filter contaminants 28 out of the storm water 12. Contaminants 28 can be any particle, substance, or chemical that is conveyed by storm water.

The filter 10 may be placed within any discharge pipe, storm drain, or outfall pipe to filter contaminants 28 out of storm water flowing there through. The ITUs 18 are connected together and deployed in-line within the outfall pipe 14. Each ITU 18 can be any desired size or shape that fits within the outfall pipe 14. For example, in one embodiment, each ITU is substantially cylindrical, approximately 30 centimeters (cm) (12 inches) long, and has a diameter from approximately 5 cm (2 inches) to approximately 15 cm (6 inches). However, it is to be understood that the values presented above are intended as examples only and the ITUs 18 not limited to those dimensions. The filter 10 may be placed within an outfall pipe prior to a storm and then removed from the outfall pipe after the storm or another desired time. The ITUs 18 may be pulled out of the outfall pipe 14 via the line 16.

The line 16 may be any rope, cable, segmented pole, or chain capable of being attached to the ITUs 18 and strong` enough to pull the ITUs 18 out of the outfall pipe 14 when full of contaminants 28. Suitable examples of the line 16 include, but are not limited to, nylon rope and stainless steel cable. The anchor attachment point 20 may be attached to any location that is strong enough to prevent the filter 10 from being washed out of the outfall pipe 14. In one embodiment of the filter 10, the anchor attachment point 20 may be connected to a storm drain grate at the inlet of an outfall pipe 14. Any suitable means known in the art (e.g., clamps, zip ties, adhesive, bolts, screws, hook and loop straps, etc.) may be used to fasten/connect the ITUs 18 to the line 16.

Figure 2:
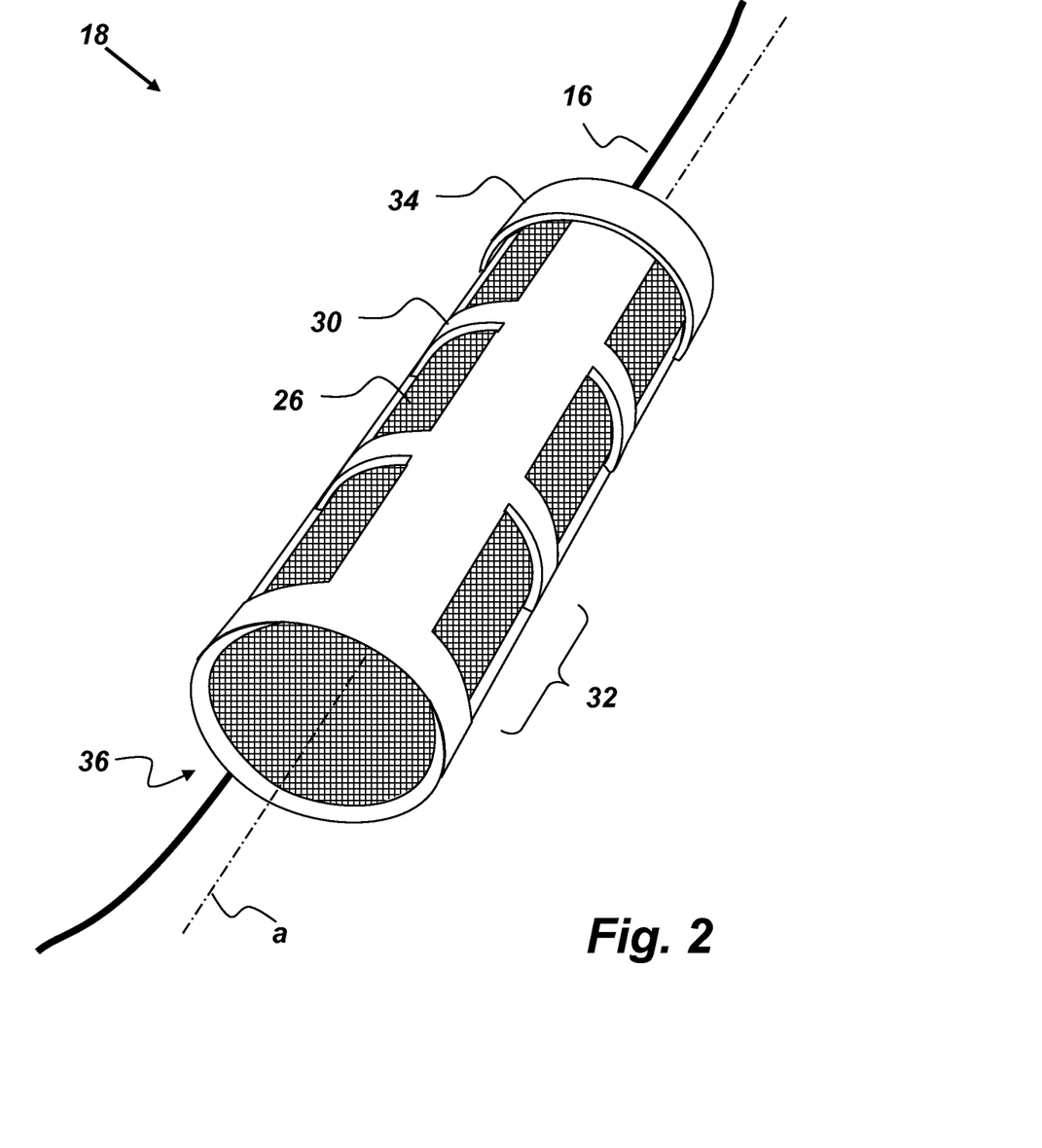
FIG. 2 is a perspective-view illustration of an embodiment of an individual treatment unit.

FIG. 2 is a perspective-view illustration of an embodiment of an ITU 18. The embodiment of the ITU 18 shown in FIG. 2 is substantially cylindrical and further comprises a rigid support structure 30 that surrounds the mesh cage 26. As used herein, the term "substantially cylindrical" includes cylinders with circular bases, cylinders with elliptical bases, and cylinders with a circular base at one end and an elliptical base on the other end. Ideally, the support structure 30 is designed to allow maximum storm water to flow through the mesh cage 26 while still providing structural support to the mesh cage 26. In some embodiments of the ITU 18, the mesh cage 26 may be self-supporting. In the embodiment of the support structure 30 shown in FIG. 2, windows 32 have been cut out along the longitudinal plane (i.e., along the axis a) to allow maximum storm water flow. Also shown in FIG. 2 is an end cap 34 and an open end 36 on the ITU 18. The ITU 18 is designed to be oriented in the outfall pipe 14 such that the open end 36 would receive storm water 12 flowing through the outfall pipe 14. The end cap 34 may be perforated or solid/non-perforated. In some embodiments, each ITU 18 may have a cap at both ends of the mesh cage 26 so as to hold media in place, but to still allow storm water 12 to flow through. In all embodiments, the open end 36 is open to receive incoming storm water 12. In embodiments where there is a cap on the open end 36, the cap covering the open end 36 would be perforated or have large enough openings to allow storm water 12 to flow through, but to keep contaminant-absorbing media within the mesh cage 26 of the corresponding ITU 18. The end cap 34 may be connected to the ITU 18 with any suitable means, including, but not limited to, adhesives, threaded attachment, screws, bolts, and clamps. For example, in the embodiment of the ITU 18 shown in FIG. 2, the end cap 34 is screwed onto the support structure 30. Some embodiments of the filter 10 may have a combination of ITUs 18 with various mesh sizes with some ITUs 18 holding contaminant-absorbing media and others without contaminant-absorbing media.

Each ITU 18 can be customized for specific contaminants 28. For example, some ITUs 18 may be configured with mesh cages 26 designed to capture total suspended solids (TSS) contaminants 28. Other embodiments of the ITU 18 may be configured to filter out particulate metal contaminants 28. In one example embodiment of the ITU 18, the mesh cage 26 may contain media (e.g. resin, any other known contaminant-absorbing media) for absorbing dissolved contaminants 28 (e.g., dissolved metals, oil, and grease) in the storm water 12. Suitable examples of absorbing media include, but are not limited to, polymeric absorbents, carbon/silicon dioxide composites, silica-based nanocomposites, polydimethylsiloxane-coated silica nanoparticles, peat moss, hydrophobic zeolites, synthetized organo-clays, aerogels, perlite, and granular activated carbon (GAC). Other types of contaminants 28 could include any type of pollutant including, for example, trash, plastic, or any other material or chemical that one does not desired to be washed into rivers/oceans through storm drains.

Figure 3A:
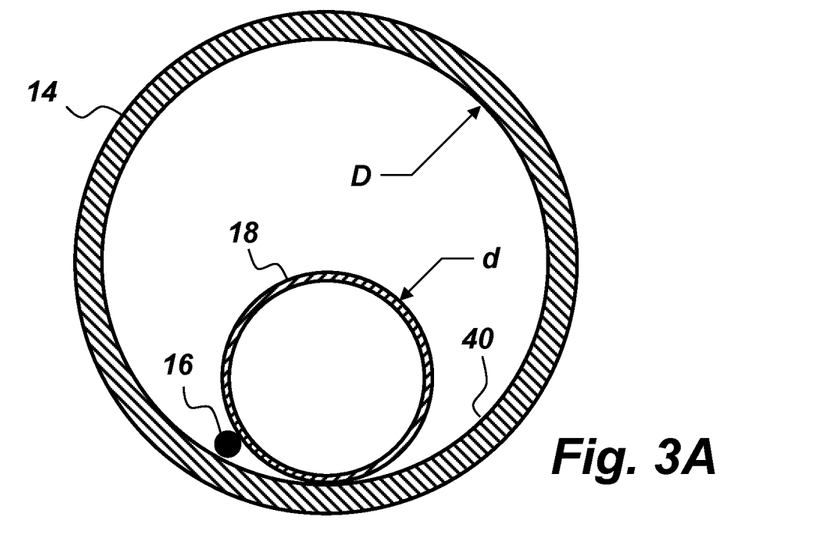
FIGS. 3A and 3B are cross-sectional end views of different embodiments of a storm water filter.
Figure 3B:
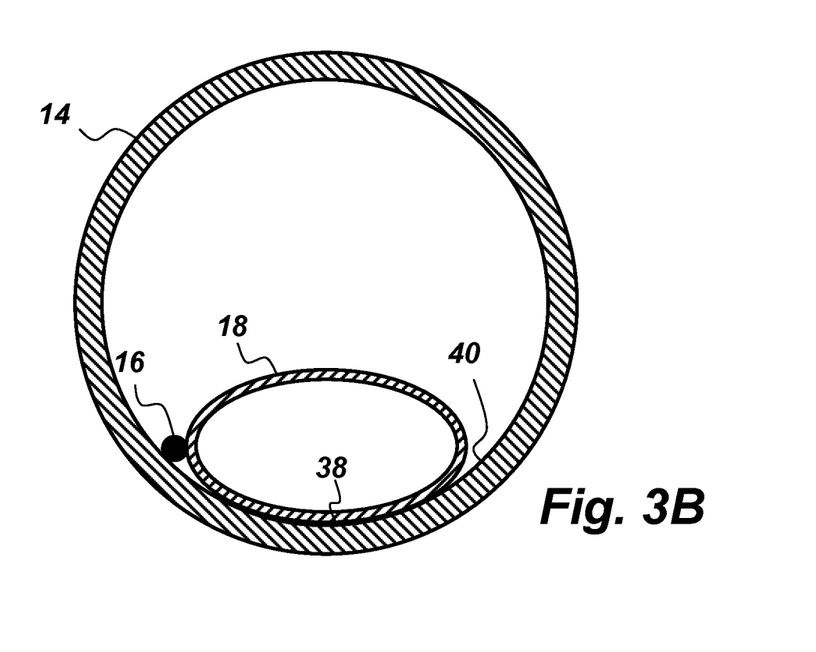

FIGS. 3A and 3B are cross-sectional end views of different embodiments of the filter 10 within an outfall pipe 14. The treatment type and ITU 18 outer diameter d can be respectively customized to specific areas or specific contaminants and to outfall pipe 14 inner diameter D. A series of multiple (e.g., 10-20) ITUs 18 can be attached to the line 16 and deployed along a segment of the outfall pipe 14, or even along a majority of the outfall pipe 14, as desired. In some embodiments of the filter 10, each ITU has an axis a-orthogonal cross-sectional area that is less than half of an axis A-orthogonal cross-sectional area of the outfall pipe 14 so as reduce the chance of creating a blockage in the outfall pipe 14. In the embodiment of the filter 10 shown in FIG. 3A, the ITU 18 has a substantially cylindrical shape with an outer diameter d that is between ¼ to ½ an inner diameter D of the outfall pipe 14. In the embodiment of the filter 10 shown in FIG. 3B, the ITU 18 has an exterior, bottom contour 38 configured to match a bottom, inner contour 40 of the outfall pipe 14.

Figure 4:
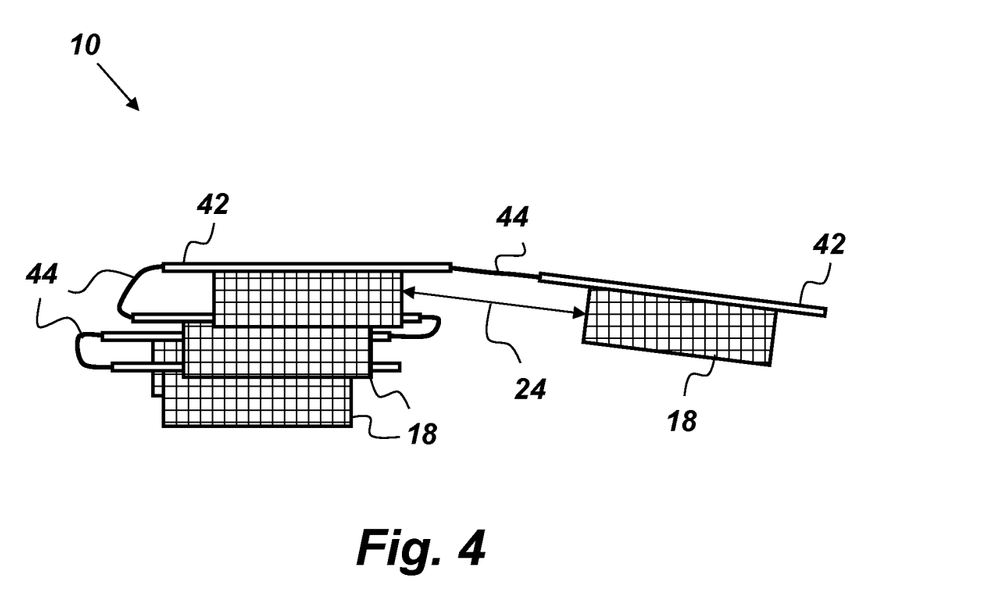
FIG. 4 is a side-view illustration of an embodiment of a storm water filter.

FIG. 4 is a side-view illustration of an embodiment of the filter 10 where the line 16 is comprised of rigid poles 42 connected serially together end-to-end via a joint 44. In FIG. 4, the joint 44 is a section of flexible line (e.g., cable, rope, chain), but it is to be understood that any type of joint known in the art may be used for the joint 44. The gap 24 may be set to any desired distance. Ideally, the gap 24 should be large enough to allow the filter 10 to be folded over and stacked on itself (such as is shown in FIG. 4) to allow for easier storage of the filter 10 when it is not deployed in an outfall pipe 14. For example, in one embodiment of the filter 10, the gap 24 between ITUs 18 is at least 25 centimeters. In another embodiment of the filter 10, the line 16 may comprise a plurality of interlocking, rigid rods such as the poles 42, but instead of being held together by the joints 44 they are held together serially by an elastic line running through an axial hole in each of the rods such that the line 16 may be elastically bent at each intersection between rods. In some embodiments of the filter 10, the ITUs 18 may form part of the line 16 with each ITU 18 forming a segment of the line 16 with flexible linkages (such as the joints 44) between adjoining ITUs 18.

Referring back to the embodiment of the filter 10 shown in FIG. 1, in that embodiment, the mesh sizes of the ITUs 18 get progressively finer between the ITU 18 positioned closest to the anchor attachment point 20 that has the largest mesh size and the ITU 18 positioned at a distal end 46 of the line 16 that is closest to the outlet 48 of the outfall pipe 14. The ITUs 18 are positioned within the outfall pipe 14 between the inlet 50 (identified in FIG. 5) and the outlet 48 such that axes a of the ITUs 18 (shown in FIG. 2) are parallel with an axis A of the outfall pipe 14.

Figure 5:
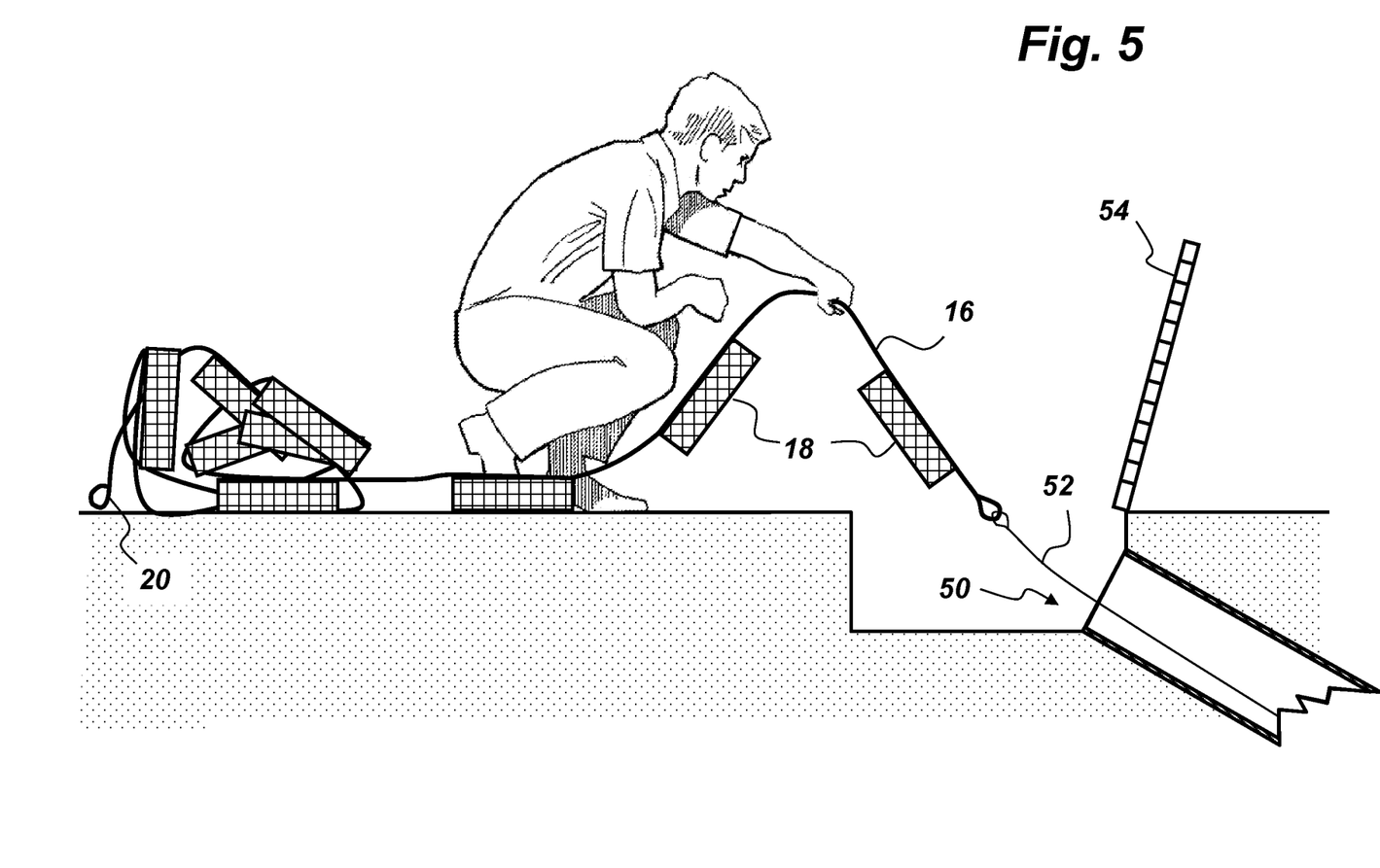
FIG. 5 is a side-view illustration of a man-portable embodiment of a storm water filter.

FIG. 5 is a side-view illustration of a man-portable embodiment of the filter 10. Embodiments of the filter 10 may be made that are small enough and light enough for a man to deploy the filter 10 in the outfall pipe 14. The filter 10 may be deployed by first positioning a pull string 52 in the outfall pipe 14. The pull string 52 is then attached to the distal end 46 of the line 16. Then, similar to the way electrical wire is pulled through a conduit, the pull string 52 and the line 16 may then be pulled through the outfall pipe 14 towards the outlet 48 until the filter 10 is in the desired position. The anchor attachment point 20 may be attached to an anchor 54 either before or after the line 16 is positioned in the outfall pipe 14. The anchor 54 shown in FIG. 5 is a storm drain grate. The anchor 54 may be any structure capable of holding the filter 10 in position in the outfall pipe 14 even as storm water 12 is flowing through it. The filter 10 may be pulled into the outfall pipe 14 from either end of the outfall pipe 14. If access to the outlet 48 of the outfall pipe 14 is not accessible, the filter 10 may be pushed into the outfall pipe through the inlet 50 by feeding one ITU 18 into the inlet 50 at a time. Once the filter 10 has performed its intended function by filtering out contaminants 28 out of the storm water 12, or at any other desired time, the filter 10 may be removed from the outfall pipe 14 by detaching the anchor attachment point 20 from the anchor 54 and then using the line 16 to pull the filter 10 out of the outfall pipe 14.

Figure 6:
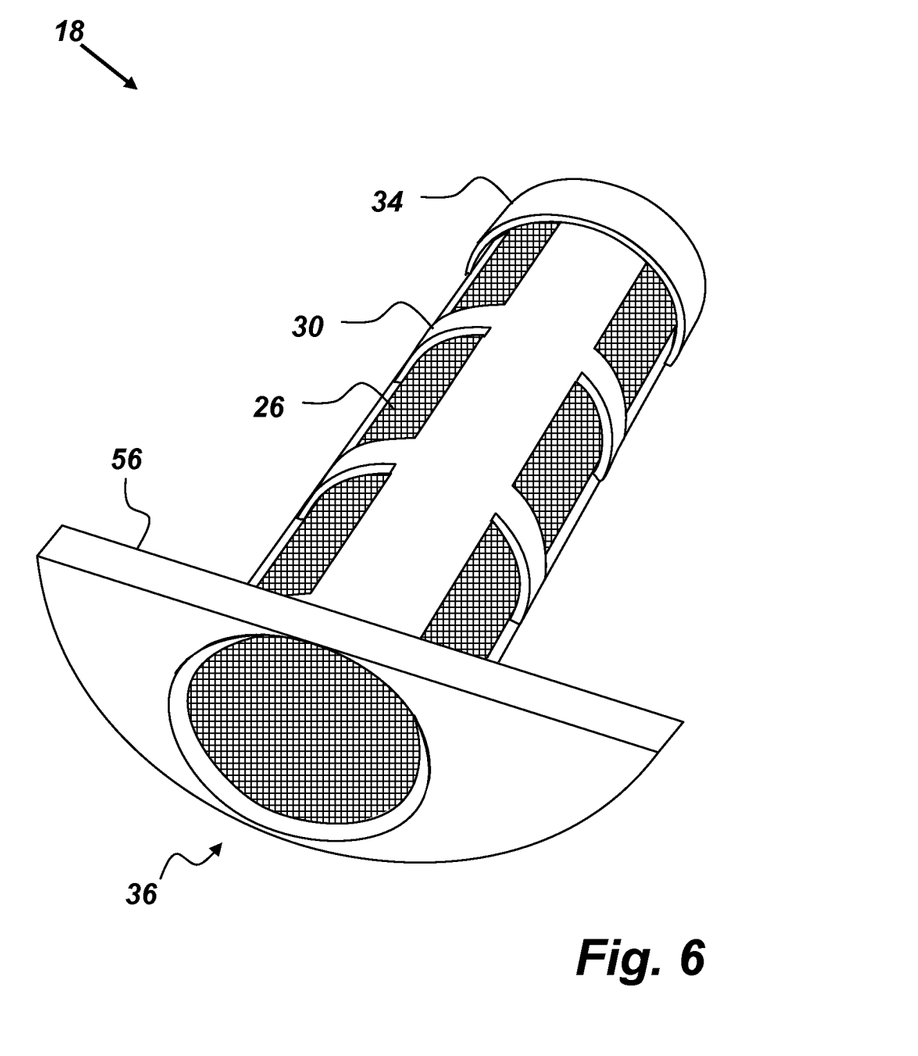
FIG. 6 is a perspective-view illustration of an embodiment of an individual treatment unit.

FIG. 6 is a perspective view of an embodiment of the ITU 18 having a contour-conforming gasket 56. In lieu of the shape of the ITU 18 conforming to the bottom, inner contour 40 of the outfall pipe 14 (such as is shown in FIG. 3B), a contour-conforming gasket 56 may alternatively be affixed to the upstream or open end 36 of each ITU 18. The gasket 56 may be made of rubber, foam, wood, or other similar gasket material capable of conforming to, or being cut to conform to, the bottom, inner contour 40 of the outfall pipe 14.

From the above description of the storm water filter 10, it is manifest that various techniques may be used for implementing the concepts of the filter 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the filter 10 is not limited to the particular embodiments described herein, but is capable of many embodiments without departing from the scope of the claims.

We claim:

1. A filter assembly for filtering storm water in an outfall pipe comprising:
   a line including an anchor attachment structure capable of fixedly holding the filter assembly in position in the outfall pipe as storm water is flowing through the outflow pipe, said anchor attachment structure being proximal an end of the line and capable of being attached to a storm drain grate; and
   a plurality of individual treatment units (ITUs) sized and shaped to fit inside the outfall pipe, and are securely connected in series to the line with a gap between adjacent ITUs, said plurality of ITUs including:
   at least one ITU including a mesh cage having an upper open end and being capable of removing particulates as flowing stormwater enters the open end of the ITU and flows through the mesh cage; and
   at least one ITU including a mesh cage having an absorbent filtration material contained therein which is capable of contacting flowing stormwater and absorbing dissolved contaminants therefrom.

2. The filter assembly of claim 1, wherein each ITU has a substantially cylindrical shape with an outer diameter that is between ¼ to ½ of the inner diameter of the outfall pipe.

3. The filter assembly of claim 2, wherein the mesh cage of each ITU has substantially cylindrical walls and a downstream end and an upstream end, and wherein the downstream end is capped with a non-perforated cap.

4. The filter assembly of claim 1, wherein the gap between ITUs is at least 25 centimeters.

5. The filter assembly of claim 1, wherein each ITU has an exterior, bottom contour shaped to match a bottom, inner contour of the outfall pipe.

6. The filter assembly of claim 1, wherein the mesh cage of each ITU is surrounded and supported by a rigid support structure.

7. The filter assembly of claim 1, wherein the outfall pipe has a length and the filter assembly is sized to extend through a majority of the length of outfall pipe between an inlet and an outlet of the outfall pipe.

8. The filter assembly of claim 1, wherein the mesh sizes of the ITUs get progressively finer between the ITU positioned closest to the anchor attachment structure that has the largest mesh size and the ITU positioned at a distal end of the line.

9. The filter assembly of claim 1, wherein each ITU further comprises a contour-matching gasket mounted on an upstream end of each ITU, wherein each contour-matching gasket is sized and shaped to match an inner, bottom contour of the outfall pipe and to guide storm water into a corresponding ITU.

10. The filter assembly of claim 1, wherein the line is made of flexible stainless steel cable.

11. The filter assembly of claim 1, wherein the line is made of nylon rope.

12. The filter assembly of claim 1, wherein the line comprises a plurality of interlocking, rigid rods held together serially by an elastic line running through an axial hole in each of the rods such that the line may be elastically bent at each intersection between rods.

13. The filter assembly of claim 1, wherein the line comprises a segmented pole having joints between segments allowing the segmented pole to be folded over on itself.

14. The filter assembly of claim 1, wherein the cross-sectional area of each ITU is less than half a cross-sectional area of the outfall pipe.

* * * * *